July 3, 1951  S. G. ISSERSTEDT  2,559,436
APPARATUS FOR MEASURING LIQUID CONTENTS OF TANKS
Filed July 30, 1947  2 Sheets-Sheet 1

INVENTOR
S. G. ISSERSTEDT
By: Fetherstonhaugh & Co.
ATT'YS

July 3, 1951 S. G. ISSERSTEDT 2,559,436
APPARATUS FOR MEASURING LIQUID CONTENTS OF TANKS
Filed July 30, 1947 2 Sheets-Sheet 2

INVENTOR
S. G. ISSERSTEDT
By: Fetherstonhaugh & Co.
ATT'YS

Patented July 3, 1951

2,559,436

UNITED STATES PATENT OFFICE 2,559,436

APPARATUS FOR MEASURING LIQUID CONTENTS OF TANKS

Siegfried Gordon Isserstedt, Toronto, Ontario, Canada, assignor to Corex Limited, Toronto, Ontario, Canada, a company of Ontario Application July 30, 1947, Serial No. 764,766

3 Claims. (Cl. 73—302)

This invention relates to an improved apparatus for accurately measuring the fluid contents of tanks, reservoirs and the like.

Hitherto great difficulty has been experienced in accurately ascertaining the fluid contents of large tanks.

In oil refineries, for instance, it is often necessary to accurately measure the output of the refinery, that is, the gasoline or oils actually produced and stored in the large storage tanks. In order to determine the efficiency of the refinery process, it is necessary that the output be determined very accurately. As the accuracy of most tank gauges is of the order of plus or minus ½ of 1%, gauges of this type cannot indicate the fuel contents of large tanks accurately enough. For instance, in a tank containing 100,000 gallons, a gauge with a tolerance of plus or minus ½ of 1% would permit a total error of 1,000 gallons.

Therefore, in oil refineries it is a practise to measure the fluid contents of large storage tanks by means of a steel tape. This is a very slow and costly process, because it is necessary for a man to climb up to the top of each tank in order to take the readings. It is, further, necessary for the man to put chalk on the steel tape so that the height of the liquid may be accurately measured. If no chalk is applied, part of the gasoline may evaporate by the time the tape is pulled up, and an inaccurate reading is obtained. In a large refinery where there are about 150 tanks, several men must be employed during each shift merely to take tank readings. During the winter, measurement of tanks becomes very difficult and hazardous, especially if, for instance, the ladder leading to the top of a 50' tank is covered with ice and sleet. During the cold weather men so employed have to wear protective clothing, grease their faces, etc. Therefore, it can be readily seen that a great need exists for a gauge which is accurate enough to remotely measure the heights of the fluid in such tanks.

It is an object of my invention to provide a simple and compact means for accurately measuring the contents of fluid receptacles, which may easily be installed in existing tanks, and which requires a minimum of attention and upkeep.

Bearing these and other objects in mind, the invention consists briefly in obtaining by known means, such as a static fluid pressure indicator, a rough reading of pressure sufficiently accurate to correctly indicate such pressure in gross units, and simultaneously or very shortly thereafter obtaining another reading of pressure at a given vertical distance from the first reading towards the surface of the liquid, and preferably relatively near the surface of the liquid, sufficiently accurate to indicate the pressure at the point at which the second reading is taken to the surface of the liquid in fractional units. Both readings may be made on the same gauge, but preferably two gauges are used, so that the two readings may be made at the same time. It is preferable according to the invention to take the second reading relatively close to the surface of the liquid or to so arrange the depths of the two readings that they roughly correspond in order of magnitude to the relationship between the order of magnitude of the gross units and fractional units in which the measurements are being taken.

Several embodiments of my invention are illustrated in the accompanying drawings in which.

Figure 1:
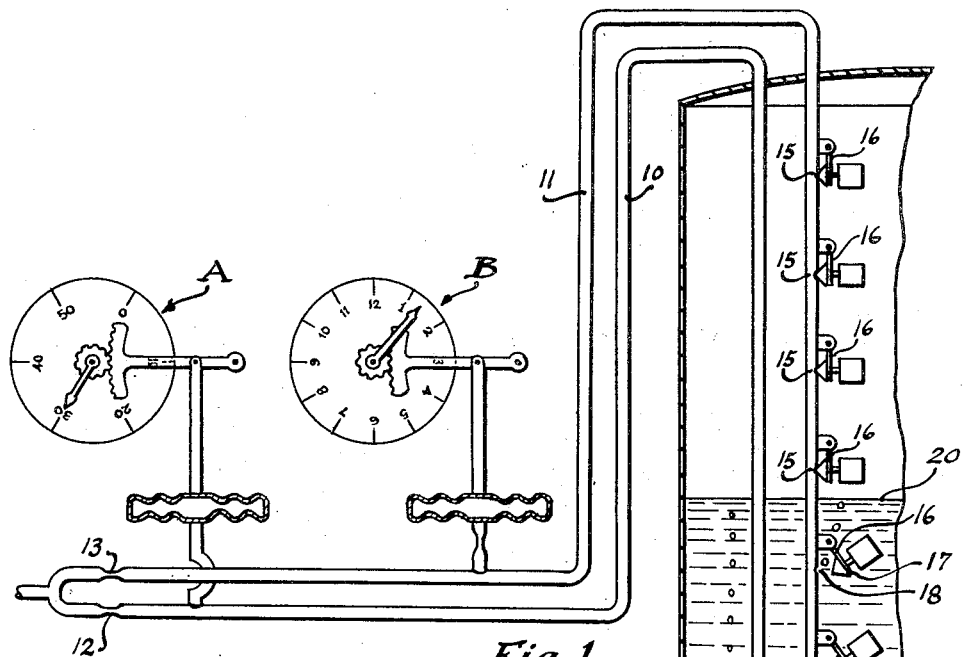
Figure 1 is a diagrammatic view of one embodiment of my invention employing a spaced series of fluid operated air valves in the air line connected to the gauge for reading fractional units.

Referring more specifically to the drawings in the embodiments shown in Figure 1, the device consists broadly of two air lines 10 and 11 connected through restrictions 12 and 13 to a single source of compressed air (not shown). The air line 10 extends vertically into a fluid tank 14, the depth of fluid in which is to be measured and terminates at a fixed point adjacent the bottom of the tank. The air line 11 also extends vertically into the tank 14 terminating adjacent the bottom thereof at the same level as the bottom of the air line 10. At uniformly spaced vertical intervals along the section of the air line 11 which protrudes into the tank 14, there are a series of openings 15 which are normally closed by valves 16 which are so designed that under normal conditions, when the opening corresponding to a particular valve is above the surface level of the liquid, the valve will be closed and the escape of air from the air line 11 through the valve will not be possible. Immersion in a fluid, however, causes the valves 16 to open as at 17 and, as shown, the fluid in the tank will fill the air line to the last opening through which air is permitted to escape, i. e. the opening 18. Connected to the air line 10 is a conventional type of diaphragm operated pressure gauge A and connected to the air line 11 is a similar gauge B. The operation of the gauge is as follows: When compressed air is passed slowly into the air lines 10 and 11 through their respective restrictions 12 and 13, fluid will be forced out of the air line 10 until bubbles commence to be emitted from the end 19 of the line. Since the rate of flow is small substantially the same pressure will obtain throughout the whole length of the line 10 from the end 19 to the restriction 12 and this pressure may be read off on the gauge A which may be suitably calibrated in feet or gallons if the specific gravity of the fluid whose depth is being measured is known. Experiments have shown that the accuracy to be expected by such an arrangement will be of the order of 0.05% of the total depth being measured. Where the height of a tank is large, this error might amount to an appreciable amount but as will be seen from the following it is sufficient to obtain a reading on a gauge A which is merely correct enough to indicate correctly the depth of fluid in gross units, that is, either in feet, thousands of gallons, or some other suitable relatively large unit. By virtue of the fact that all the valves 16 situated below the surface 20 of the fluid have been opened to unmask the opening 15 as before explained air from the air line 11 will escape from opening 18 with the fluid surface in the position shown and fluid will fill the air line 11 up to opening 18. Thus, the pressure which will be indicated on the pressure gauge B will be merely the depth of the hole 18 below the surface 20 of the fluid which will always be less than the distance between two adjacent holes 15. As before the probable error in the pressure reading of the gauge B is of the order of 0.05% of the total depth measured which in this case instead of being that percentage of the total depth of the fluid will be merely that percentage of the depth between the opening 18 and the surface 20 (or something less than 0.05% of the distance between consecutive openings). Thus, if the gauge B is calibrated in inches and the distance between consecutive openings is one foot it is possible at any given time to read off an accurate reading of depth of fluid in the tank 14 to within 0.05% of one foot taking the feet reading from the gauge A and the inches reading from the gauge B and the probable error will have been reduced from 0.05% of 10 feet, assuming that in this case, the tank is filled to a depth of 10 feet, and which error would amount to 0.05% of 10 feet, or .6 inch, to 0.05% of 1 foot, or 0.06 inch. In other words, the accuracy has been increased 10 times over previous types of air line depth gauges. Due to the capillary restrictions 12 and 13, it is possible to feed both air lines from the same source of air pressure without having any feed back from the air line 10, which has the higher pressure, into the air line 11 with its lower pressure, and it is preferable, although not essential, in designing the apparatus to have the restriction 13 of such dimensions as will offer an appreciably greater resistance to air flow than will the restriction 12.

Figure 2:
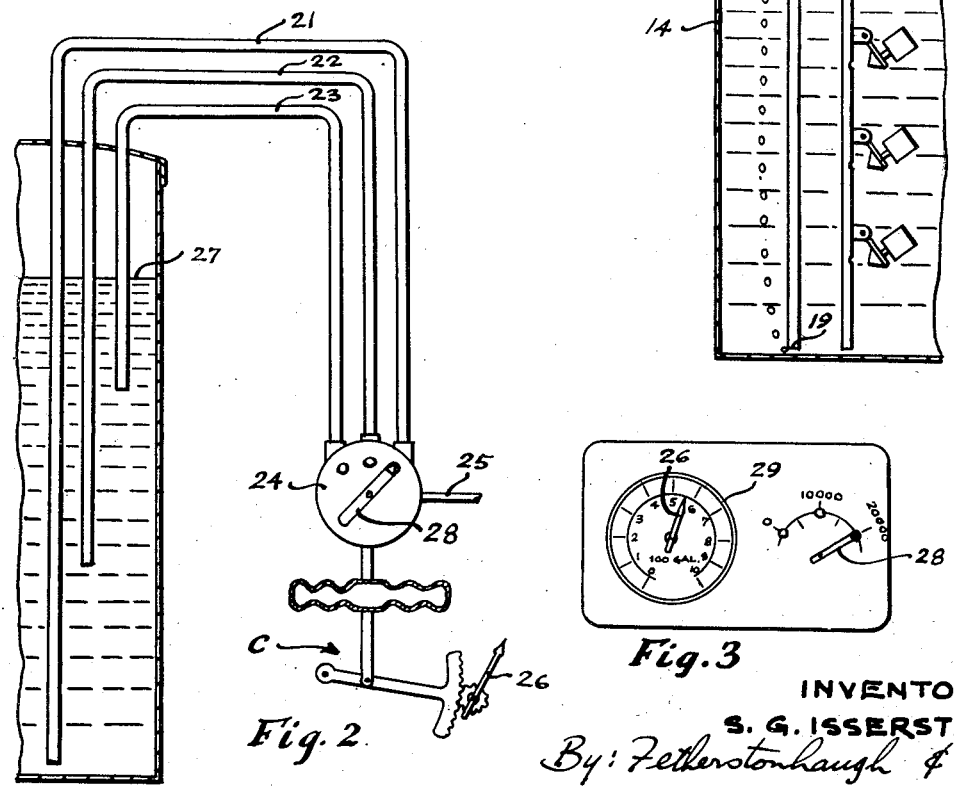
Figure 2 is a diagrammatic illustration of a further embodiment of the invention using three air lines terminating at spaced intervals within a tank.

In many cases, it is possible to predetermine the permissible error of depth measurement and should this permissible error not be less than a relatively large fraction of the actual error in measuring the total depth of fluid with one air line such as the air line 10, it is possible to carry out a depth measurement of sufficient accuracy using an apparatus of much greater simplicity than that shown in Figure 1 necessitating a plurality of fluid operated valves 16. Such an apparatus is illustrated in Figure 2 where an apparatus is shown which will give a depth measurement subject to only one-third of the probable error that would be present in the case where a single air line is used. In this case, three air lines 21, 22, and 23 are connected to a triple throw air valve 24 which is connected to a source of air pressure (not shown) by means of air line 25 and to a pressure gauge C of the type described with respect to the apparatus shown in Figure 1. When the valve 24 is in register with a given air line, the pressure indicated on the gauge C will be substantially that which obtains at the immersed end of that particular air line. The gauge C is designed so that one complete revolution of the pointer 26 will correspond to the vertical distance between subsequent air line terminations and to measure a depth with such an apparatus it is merely necessary to operate the valve 24 into register with one after the other of the air lines 21, 22, and 23 until a reading is obtained during the first revolution of the pointer 26. Thus, with the surface of the fluid at 27, the valve 24 would have to be operated into register with the air line 23 to give a reading during the first revolution of the pointer 26. Should the valve be moved into the position shown, that is, into register with the air line 21, the pointer would make almost two and a half revolutions before coming to rest and similarly with the valve 24 in register with the air line 22 the pointer 26 will make nearly one and a half revolutions before coming to rest and since the probable error when using pressure gauges of the diaphragm type varies directly as the expansion of the diaphragm, it can readily be seen that in having the three air lines instead of one it is possible to make a reading using one-third of the diaphragm expansion as would be the case when using only one air line and thus, the accuracy of the measurement has been increased three times. It is thus possible by varying the number of air lines to provide air flow measurement of the accuracy that is necessary in any particular case.

Figure 3:
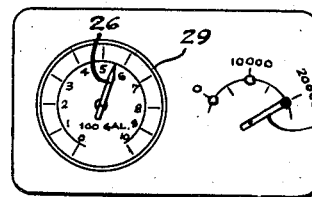
Figure 3 is a front elevation indicating a control panel of a pressure gauge suitable for use in conjunction with the embodiment shown in Figure 2.

Figure 3 shows the control panel of the pressure gauge C shown in Figure 2 and the arm 28 on the control panel operates the valve 24. The three positions of the arm 28 corresponding to the three positions of the valve 24 are calibrated to correspond to the number of gallons which would be contained in the tank were it full exactly to the bottom of the particular air line which is registered with the valve 24. Thus, to obtain a complete reading of cubic content it is merely necessary to add to the figure indicated by the arm 28 the figure indicated by the pointer 26 on the gauge dial 29.

Figure 4:
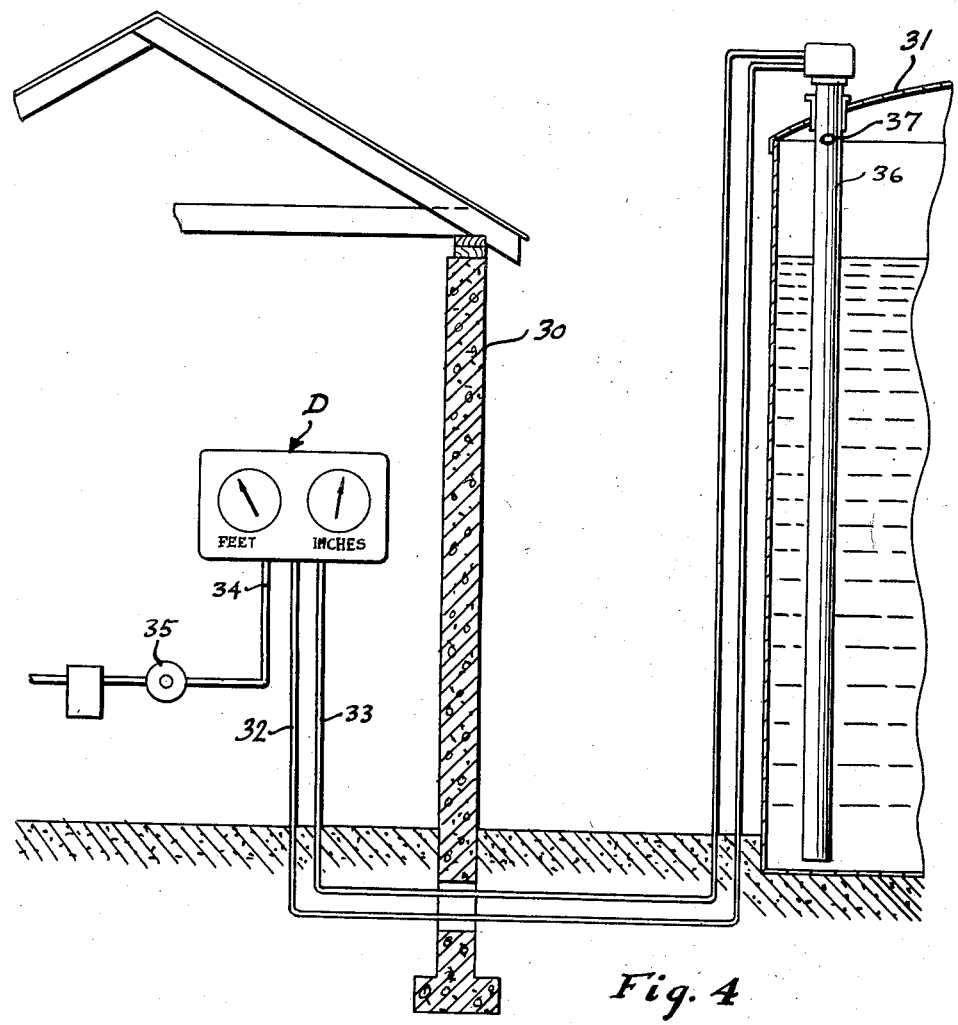
Figure 4 is an illustration of a practical means of setting up the embodiment shown in Figure 1 for remotely reading the depth of fluid in one or a number of tanks situated at a distance.

The apparatus illustrated in Figure 4 is largely self-explanatory and shows a practical set up using my invention which includes a gauge house 30, and a tank 31, a pair of gauges D connected to two air lines 32 and 33 and to a source of compressed air through air line 34 and air valve 35 in a manner similar to the arrangement shown in Figure 1. In this case, the air lines 32 and 33, correspond to the lines 10 and 11 in Figure 1. The portion of airlines 32 and 33 which extend within the tank are housed completely within a large pipe member 36 so that the whole gauge may be removed from the tank as a unit for servicing from time to time. An opening 37 in the pipe 36 ensures that no build up of pressure can occur within the pipe housing. In a set up as shown in Figure 4 it is possible to have air lines from a number of large tanks leading into a single gauge house where one operator might take accurate readings of depth for all the tanks at substantially the same time and thus obtain an accurate measurement of the total amount of the contents of all the tanks at one given time, and thus eliminate the necessity for the laborious process of having a crew climb to the top of each individual tank with a tape as is currently the practice in carrying out the same type of measurement.

What I claim as my invention is:

1. A device for measuring fluid depth with increased accuracy comprising, two gas lines, each operably connected to gas pressure measuring means, and to each of which compressed gas is suppliable through a restriction, said gas lines terminating at a fixed position in a fluid container, the first of said gas lines being free of openings over its entire length, and the second of said gas lines having a plurality of uniformly axially spaced openings, said openings being normally closed by fluid immersion operable valve means whereby, upon operation when said fluid container contains fluid, the pressure measuring means connected to said first gas line will indicate large unit functions of the fluid depth, and the pressure measuring means connected to said second gas line will indicate small unit functions of the fluid depth.

2. A device for measuring fluid depth as claimed in claim 1 in which said two gas lines are housed within a single pipe member open to communicate with fluid at the bottom of the tank at one end and open to communicate with the atmosphere at its other end.

3. A device for measuring fluid depth as claimed in claim 1 in which said fluid immersion operable valve means comprises a valve pivotally mounted on the second of said gas lines and weighted to normally seat over said opening, and a float carried by said valve designed to lift said valve from said seat when it is immersed in the fluid whose depth is to be measured.

SIEGFRIED GORDON ISSERSTEDT.

REFERENCES CITED

The following references are of record in the file of this patent:

UNITED STATES PATENTS

| Number | Name | Date |
|---|---|---|
| 1,289,755 | Haynes | Dec. 31, 1918 |
| 1,699,812 | Sartakoff | Jan. 22, 1929 |
| 1,819,655 | Mohr | Aug. 18, 1931 |
| 1,871,182 | King | Aug. 8, 1932 |
| 2,455,200 | Wallace | Nov. 30, 1948 |

FOREIGN PATENTS

| Number | Country | Date |
|---|---|---|
| 490,532 | Germany | Feb. 18, 1928 |